United States Patent

[11] 3,630,797

| [72] | Inventors | James D. Mallory<br>Maumee;<br>Frederick L. Wallington, Perrysburg, both of Ohio |
|---|---|---|
| [21] | Appl. No. | 883,515 |
| [22] | Filed | Dec. 9, 1969 |
| [45] | Patented | Dec. 28, 1971 |
| [73] | Assignee | Owens-Illinois, Inc. |

[54] METHOD AND APPARATUS FOR ASSEMBLING BULB-SHAPED GLASS CONTAINERS HAVING CYLINDRICAL BASE ELEMENTS
18 Claims, 11 Drawing Figs.

[52] U.S. Cl. .................................................. 156/69,
53/67, 53/141, 65/152, 156/293, 156/321, 156/322
[51] Int. Cl. ...................................................... C09j 5/00, B22b 31/00
[50] Field of Search .......................................... 65/36, 42, 43, 153, 152, 154, 156, DIG. 10; 156/69, 293, 321, 322; 53/67, 141

[56] References Cited
UNITED STATES PATENTS

| 2,289,999 | 7/1942 | Schutz | 65/156 |
| 1,866,369 | 7/1932 | Podel | 53/67 |
| 2,347,407 | 3/1944 | Goodwin | 53/141 |

*Primary Examiner*—S. Leon Bashore
*Assistant Examiner*—Saul R. Friedman
*Attorneys*—John R. Nelson and Edward J. Holler ABSTRACT: Methods and apparatus for assembling composite containers consisting of bulb-shaped glass containers having spherically shaped bottoms with cylindrical base elements fixed to the bottoms. Cylindrical base elements are fed by a chute to a resiliently releasable discharge gate in the path of travel of inverted bulb-shaped glass containers along a conveyor, the container stripping its base element from the chute discharge gate as the container is conveyed past the gate. The base element is subsequently oriented, aligned and permanently bonded to the bulb-shaped container. Bonding is accomplished by use of a hot melt adhesive applied to the base element, said adhesive being activated by the residual heat of the container. The container conveyor supports normal sized containers at a fixed elevation during the assembly operation, but permits over-length containers to be depressed by a height-limiting device to avoid interference with the discharge gate.

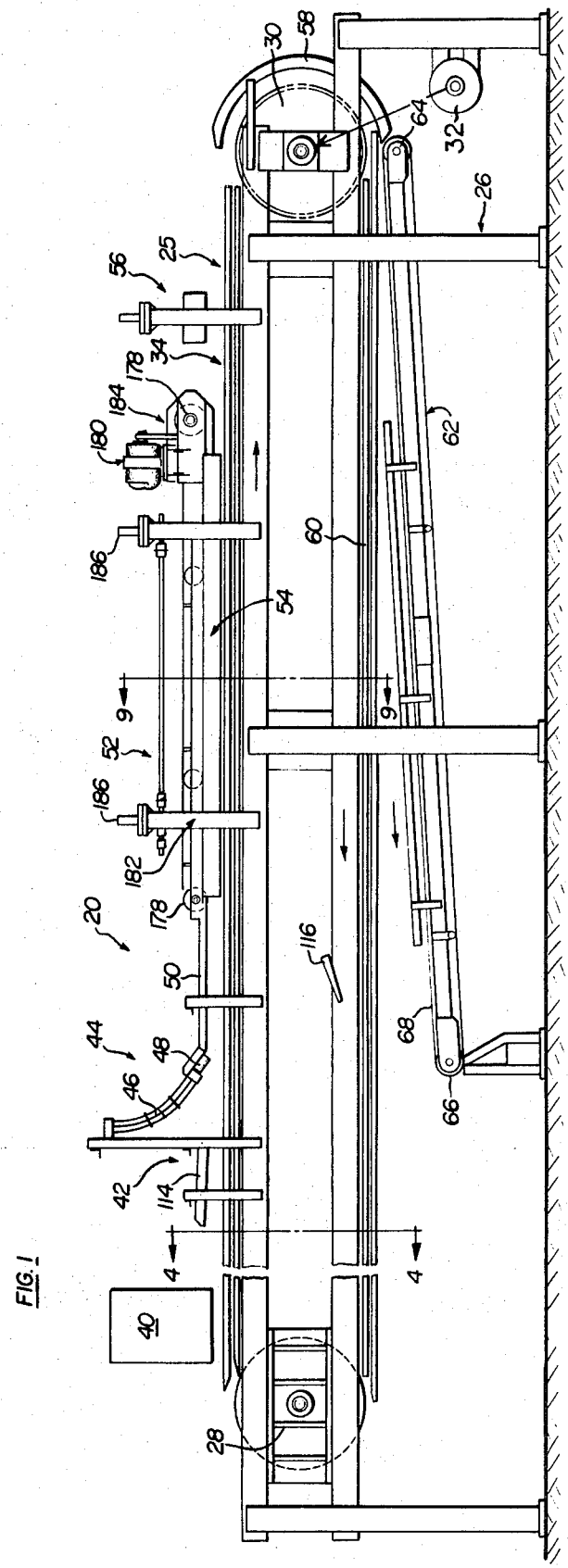
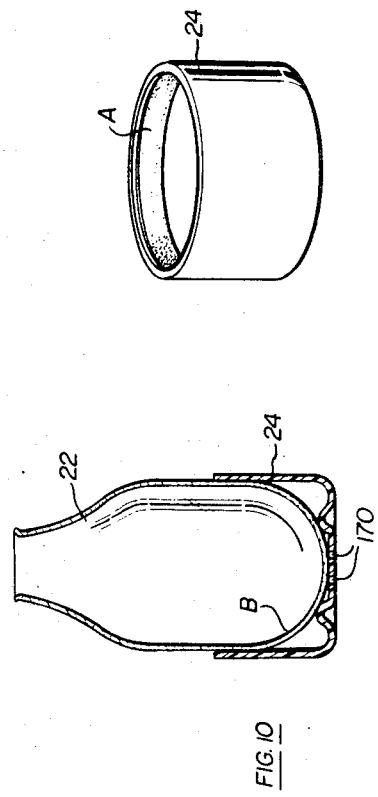
FIG. 1
FIG. 10
FIG. 11
INVENTORS
JAMES D. MALLORY.
FREDERICK L. WALLINGTON.
BY
ATT'Y.

INVENTORS
JAMES D. MALLORY.
FREDERICK L. WALLINGTON.

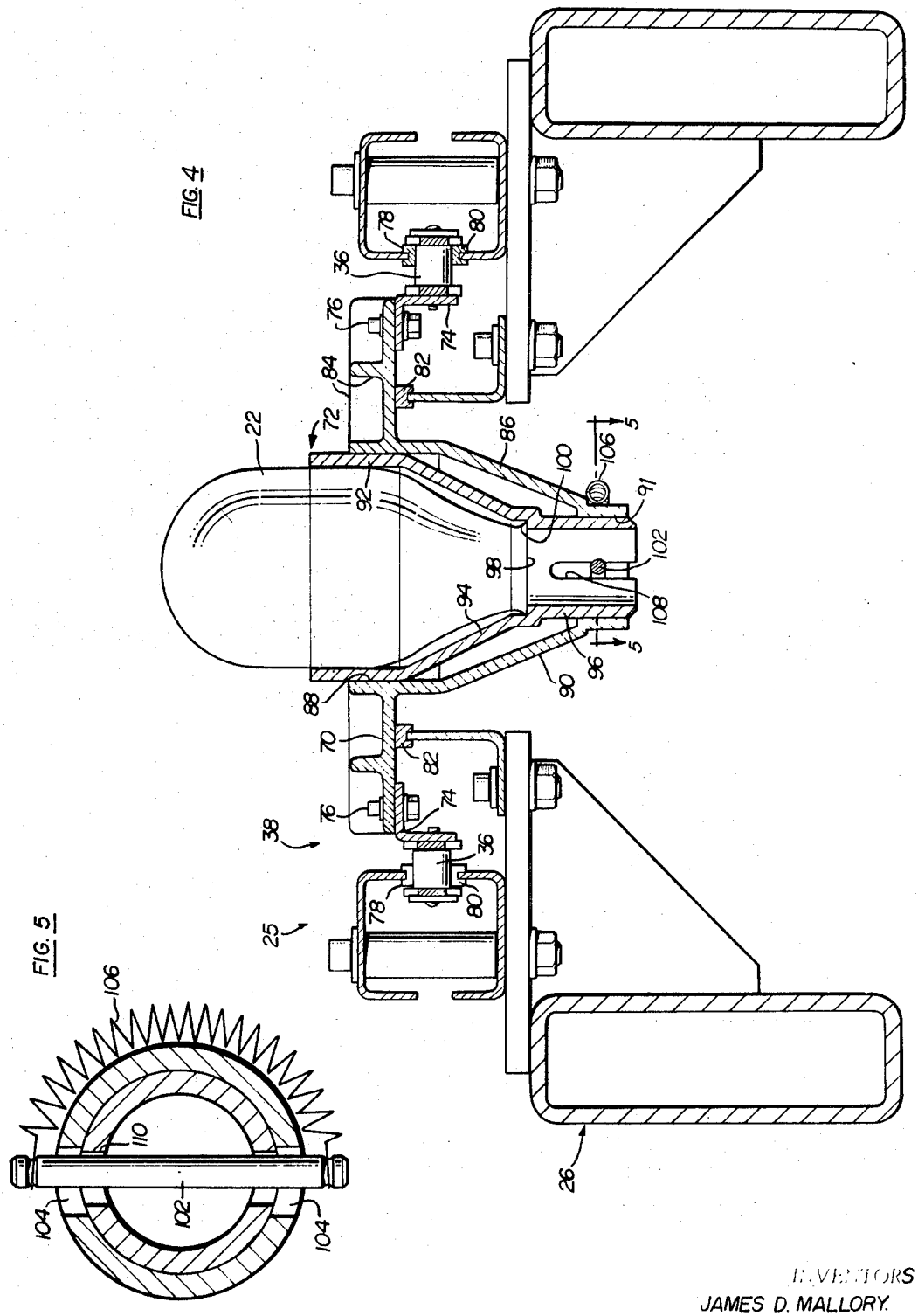

3,630,797

METHOD AND APPARATUS FOR ASSEMBLING BULB-SHAPED GLASS CONTAINERS HAVING CYLINDRICAL BASE ELEMENTS

SUMMARY OF THE INVENTION

The invention is specifically directed to assembling on a mass production scale composite containers consisting of a bulb-shaped glass container and a cylindrical or cup-shaped base element which is mounted on the generally spherical bottom of the bulb-shaped container to provide stability. The glass containers, while still residually heated from their forming operation, are fed in line in an inverted position along a conveyor which passes beneath a chute through which the base elements, likewise in inverted position, are fed to a discharge gate at the terminus of the chute. The discharge gate supports the base element in an inclined position in the path of the containers such that the container passes into underlying relationship with the base element and then engages the sidewall of the base element to strip the base element from the discharge gate by movement of the container past the gate. The base element drops onto the container into an approximate assembled position and is carried by further advancement of the container into underlying relationship with a base aligning cam and overhead conveyor which shifts the base element on the container to accurately align the axis of the cylindrical base with the axis of the container. This manipulation of the base is required because the shape of the container is such that it does not offer any positive or preferred position to the base element.

The manner of formation of the containers is such that, as presented to the assembly machine, the variation in height between individual containers is sufficient to create a problem with respect to the base element discharge gate. The discharge gate supports the base element at an inclined position such that the container bottom can pass freely beneath the side of the base which is upstream with respect to the direction of movement of the container, and will strike the inner side of the base element at the opposite side of the base. Because the base element must be mechanically supported from beneath in the discharge gate, it is apparent that containers of an excessive height can be jammed at the discharge gate. In order to prevent this, the containers are supported upon the conveyor in a pocket which is slidably mounted for vertical movement in a pocket support element. The pocket is normally latched by a detent assembly at a position of maximum elevation relative to its support. At a location upstream of the conveyor from the discharge gate, containers are passed beneath a stationary height limiting cam. Overlength containers are engaged by the cam and pressed downwardly, causing the pocket latching detent to release. The pocket can then be forced downwardly within its support until the bottom of the overlength container is at an elevation such that it will properly clear the discharge chute. The detent mechanism is such that when the detent is disengaged, it acts as a frictional coupling between the pocket and its support so that the pocket and the container which it supports remain at the elevation established by the height limiting cam. Thus, overlength containers will remove base elements from the discharge chute in exactly the same manner as do the normal length containers.

The base elements are supplied to the discharge gate with an annular band of hot melt adhesive on the interior of the base element wall. This adhesive is activated by the residual heat in the glass container, and after the base has been aligned on the container, the assembled base and container are conveyed past a cooling station in which cold air is blown onto the container to set the adhesive while the base is positively maintained in its aligned position by the overhead conveyor.

The cup-shaped base element, when seated on the container, snugly engages the container around its entire periphery, and vent openings are formed in the base bottom to allow air to escape from the base interior as it is being seated on the container. These openings are subsequently sealed after the base has been bonded to the container.

Other features, objects and advantages of the invention will become apparent by reference to the following specification and to the drawings.

IN THE DRAWINGS:

FIG. 1 is a side elevational view, partially broken, of an assembly apparatus embodying the present invention;

FIG. 4 is a detail transverse cross-sectional view of the conveyor of the apparatus of FIG. 1 taken approximately on line 4—4 of FIG. 1;

FIG. 5 is a detail cross-sectional view taken on line 5—5 of FIG. 4;

FIG. 10 is a cross-sectional view taken on a central vertical plane of an assembled container;

FIG. 11 is a perspective view of the plastic base element of the container prior to assembly.

GENERAL DESCRIPTION

Figure 2:
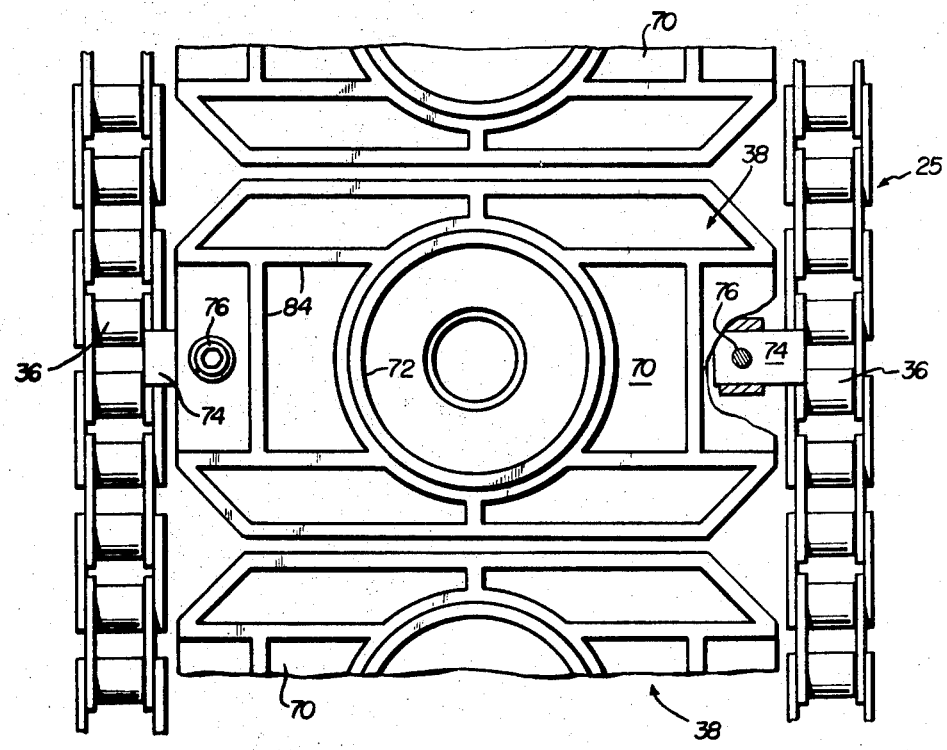
FIG. 2 is a detail plan view showing details of the container supporting conveyor of the apparatus of FIG. 1.

Referring first to FIGS. 1, 10 and 11, the assembly apparatus designated generally 20 is designed to assemble composite containers of the type shown in cross section in FIG. 10. The composite container consists of two elements, namely a generally bulb-shaped glass container 22 and a cylindrical cup-shaped plastic base element 24. As shown in FIG. 10, glass container 22 is formed with a spherically shaped bottom B, and the function of base element 24 is to provide a stable support for the spherically bottomed glass container. The composite container consisting of glass container 22 and base element 24 is the subject matter of U.S. Pat. No. 3,372,826.

Assembly apparatus 20 includes an endless chain conveyor designated generally 25 which is mounted upon a suitably designed stationary framework 26 and operatively trained about opposite end rolls or sprockets 28, 30 rotatably mounted in frame 26. Conveyor 25 is driven by suitable means, such as a schematically illustrated drive motor 32 in a direction such that its chains pass around end rolls 28, 30 in a clockwise direction so that the upper run 34 of the conveyor moves from left to right as viewed in FIG. 1.

Referring briefly to FIG. 4, it is seen that conveyor 25 includes a pair of transversely spaced roller chains 36, between which are supported and carried a series of container support assemblies designated generally 38. As indicated in FIG. 4, containers 22 are carried in an inverted position along the upper run 34 of conveyor 25.

Returning now to FIG. 1, containers 22 are loaded into support elements 38 of conveyor 25 by suitable apparatus which may take any of several alternative forms and is thus illustrated only schematically at 40 in FIG. 1. After being loaded onto support elements 38 of conveyor 25 by loader 40, the containers are carried by conveyor 25 to the right as viewed in FIG. 1, and first pass beneath a height gauging or limiting device designated generally 42 whose structure and function will be described in greater detail below.

After passing beneath height limiter 42, the containers move to an assembly station designated generally 44 at which plastic base elements are fed by a chute 46 to a discharge gate 48, shown in more detail in FIG. 6, and described in more detail below. As a container is conveyed to the right past discharge gate 48, the container bottom engages and removes from the discharge gate 48 a base element which drops onto the container into an approximate assembled position.

Further rightward movement of the container by conveyor 25 causes the container and its captured base element to pass beneath a stationary seating plate 50 which is inclined downwardly to the right as viewed in FIG. 1. The seating plate 50 slidably engages the bottom of the captured base and presses the base downwardly onto the container.

Because of the slight inclination of seating plate 50, the base is not seated exactly squarely upon the container, and as the base and container are conveyed beyond the right-hand end of seating plate 50, the base bottom moves into engagement with the lower run of an endless belt conveyor 52, described in greater detail below. The lower run of conveyor 52 which engages the base is driven in the same direction and at the same speed as the base and container being advanced by conveyor 25. The engagement between the conveyor and base bottom is such that the base is squared up so that its lower supporting surface is moved into precise perpendicularity with the vertical axis of the glass container.

Referring briefly to FIG. 11, the bases are fed to the assembly station 44 with an annular band of a hot melt adhesive A on the interior surface of the base near the upper end of the base on the region of the base which will contact the side of the glass container when the container and base are assembled. In the intended mode of operation of the assembly apparatus here disclosed, the glass containers are loaded onto the container conveyor 25 while they are still residually heated from the container forming machine to a temperature high enough to activate the hot melt adhesive. To set the adhesive, cooling means designated generally 54 extend along the path of travel of the containers in coextensive relationship with the overhead conveyor 52 which performs the final alignment of the base upon the container. Conveyor 52 maintains this final alignment while the container and its assembled base are exposed to the action of cooling means 54 so that the adhesive is set to permanently bond the base to the glass container while the base and container are accurately maintained in their aligned relationship by conveyor 52.

After clearing the overhead conveyor 52 and cooling means 54, the assembled containers and bases pass beneath a vent sealing means 56 whose function will be described in more detail below and then pass around end sprocket 30.

A curved backup plate 58 slidably engages the base bottoms to hold the bases and containers in conveyor 25 as they pass around sprocket 30 and become inverted into an upright position. As the assembled containers and bases are carried onto the lower run 60 of conveyor 25, the assembled bases and containers pass from the curved backup plate 58 onto the upper run of an endless belt-type takeout conveyor designated generally 62.

Takeout conveyor 62 is a simple endless belt conveyor having a belt operatively trained about end rollers 64 and 66, the belt being driven in a counterclockwise direction about the end rolls so that the upper run 68 moves to the left as viewed in FIG. 1 in the same direction and at the same speed as does the lower run 60 of container support assemblies 38.

CONTAINER SUPPORT ASSEMBLY

Structural details of container support assemblies 38 are best seen in FIGS. 2 through 5 of the drawings.

Each support element assembly 38 includes two major components, namely, a main support element 70 and a second support element 72 which, for purposes of description, will be referred to as pocket 72. As best seen in FIG. 4, main support elements 70 are mounted upon chains 36 as by mounting brackets 74 which are attached to and carried by chains 36 and bolted to the main support element 70 by bolts 76. Chains 36 and main support element 70 are supported and guided upon the conveyor frame 26 by guide rails 78, 80 and 82 fixedly mounted by appropriate structure on conveyor frame 26. Guide rails 78, 80 and 82 are preferably formed from strips of a suitable plastic material having a relatively low coefficient of friction. The function of guide rails 78, 80 and 82 is to establish an accurately regulated path of travel for support element 70, particularly along the upper run of conveyor 25 for reasons which will be developed below.

Main support element 70 is a generally flat rectangular platelike element which may, depending on the material and manner of construction, be formed with suitably located stiffening ribs such as 84. Integrally formed in main support element 70 is a centrally located sleeve 86 having a large diameter opening at its upper end and tapering inwardly as at 90 to terminate at a relatively small diameter opening 91 at its lower end. Pocket 72 is complementary in shape to sleeve 86 and dimensioned so as to be slidably received within the interior of sleeve 86. Like sleeve 86, pocket 72 is open at its upper and lower ends and is formed with a generally cylindrical large diameter upper section 92 which merges with an inwardly tapered section 94 which in turn merges with a small diameter lower end section 96. As indicated in FIG. 4, the internal dimensions of pocket 72 are chosen so that a glass container 22 can be received within the interior of pocket 72 with the mouth or finish 98 of the container resting upon a supporting shoulder 100 formed in the interior of pocket 72.

Figure 3:
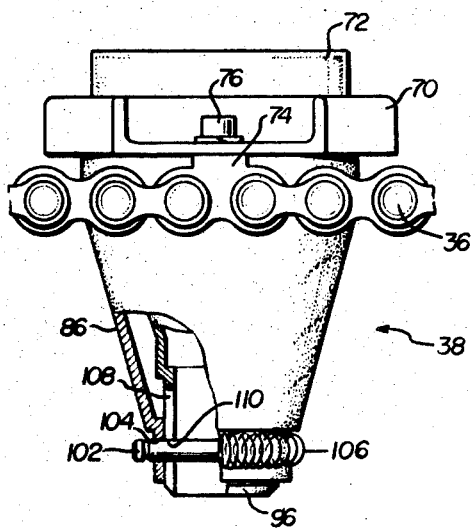
FIG. 3 is a detail side elevational view of a portion of the container supporting conveyor of FIG. 1.

Pocket 72 is capable of vertical sliding movement within sleeve 86, and is shown, in FIG. 4, at its position of maximum elevation relative to sleeve 86. Pocket 72 is releasably latched or maintained in the maximum elevated position shown in FIG. 4 by a detent assembly which includes a detent pin 102 which is slidably supported in sleeve 86 for limited horizontal movement by means of slots 104 (see FIG. 3) at diametrically opposed positions at the lower end of sleeve 86. Slots 104 support pin 102 against vertical movement relative to sleeve 86, but permit the pin to shift horizontally. Pin 102 is resiliently biased toward one end of the slots 104 by a tension spring 106 (FIG. 5). As best seen in FIG. 3, axial slots 108 extend upwardly from the lower end of pocket 72 at diametrically opposed locations. The widths of slots 108 is only slightly greater than the diameter of pin 102 except for a notch 110 cut into each slot 108 to receive pin 102 when the pocket is at its normal position of maximum elevation relative to sleeve 86. Spring 106 will normally retain pin 102 seated in the notches 110. However, if sufficient downward force is applied to pocket 72, pin 102 will be cammed out of notch 110 to permit pocket 72 to slide downwardly within sleeve 86. Spring 106 exerts a sufficient biasing action on pin 102 so that pin 102 will frictionally grip and retain pocket 72 at any position of elevation relative to sleeve 86 in the absence of sufficient downward force to overcome the frictional retention. The open lower end of slots 108 is for the purpose of mounting or removing the pocket from sleeve 86.

HEIGHT LIMITING DEVICE

The function of the detent assembly just described above is to prevent jamming or interference of containers carried on conveyor 25 with the structural elements of discharge gate 48. The degree of precision in the vertical positioning of the container bottom with respect to the discharge gate 48 is greater that the degree of precision in regulating the overall length of the glass containers in the particular container forming process employed. The container manufacturing tolerances are such as to present the possibility of an overlength container striking or jamming the discharge gate.

To positively assure clearance between overlength containers and discharge gate 48, a height-limiting device or cam 42 is mounted above the path of movement of containers along the upper run of conveyor 25 at a location upstream of the path of travel of the containers from discharge gate 48. Height-limiting cam 42 consists simply of a flat plate 114 mounted on frame 26 and extending longitudinally of the path of travel and inclined downwardly in the downstream direction of movement of containers on conveyor 25. The height of cam 114 above the path of movement of the chains 36 and main support elements 38 is selected so that the lowermost portion (right-hand end as viewed in FIG. 1) of the cam 114 is at an elevation above the path of the chains which will assure clearance of the container at the discharge gate. It will be recalled that the path of travel of chains 36 and the main support elements 70 is accurately regulated by the guide rails 78, 80 and 82, and hence the elevation of cam 114 above this precisely determined path of travel can be readily matched to a height necessary to provide adequate clearance at the discharge gate.

At the time containers are loaded into pockets 72 at loading station 40, pockets 72 are latched at their maximum elevation, as shown in FIG. 4, with detent pin 102 seated in notches 110. The container seats itself in pocket 72 with its finish or mouth 98 seated upon the shoulder 100 and hence the distance by which the container bottom projects above the path of travel of support element 70 is determined by the length of the container. As the containers are conveyed beneath cam 114, overlength containers will be engaged by the inclined underside of the cam and pressed downwardly. The force pressing the container downwardly will unseat detent pin 102 from the notches 110 and pocket 72 will slide downwardly within sleeve 86, under the force applied by the stationary cam 114 until the container passes beyond the downstream end of the cam. At this time, the container bottom will have been forced by the cam downwardly to a predetermined or permitted maximum elevation above the path of travel of support element 70, and this permitted maximum elevation assures clearance of the structure of the discharge gate by the container bottom. As explained above, the frictional grip of the detent pin 102 against the sidewall of slot 108 frictionally latches pocket 72 in the vertical position to which it has been depressed by the action of cam 114 on the container bottom.

During the transit of support assemblies 38 along lower run 60 of conveyor 25, the now inverted support assemblies pass beneath a reset cam 116 which is fixedly mounted at a distance above the path of travel of the support assemblies to engage the small diameter end portions 96 of any pockets which have been depressed by the action of height-limiting cam 114 to force the pockets back to their normal extended position with detent pin 102 again seated in the notches 110 of the pocket. The reset cam is similar in structure and action to height-limiting cam 114.

ASSEMBLY STATION

Figure 6:
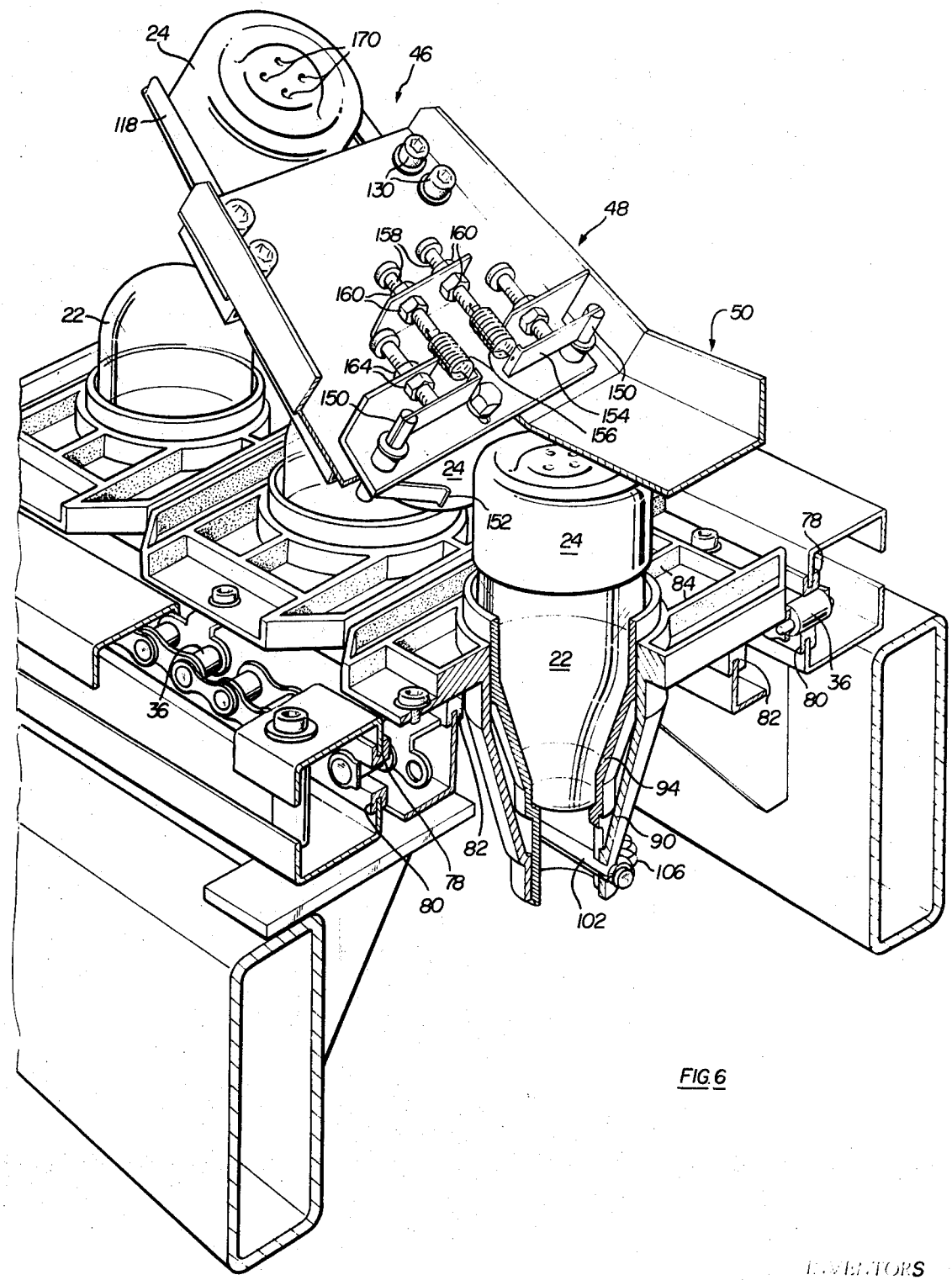
FIG. 6 is a detail perspective view, with certain parts broken away or shown in cross section showing the assembly station at which base elements are placed upon the glass containers.
Figure 7:
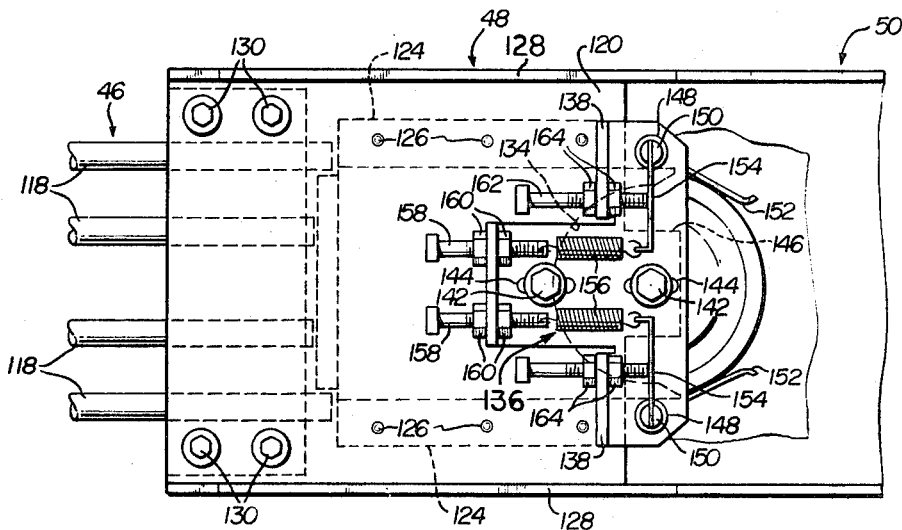
FIG. 7 is a detail top plan view of the discharge gate assembly partially broken away.
Figure 8:
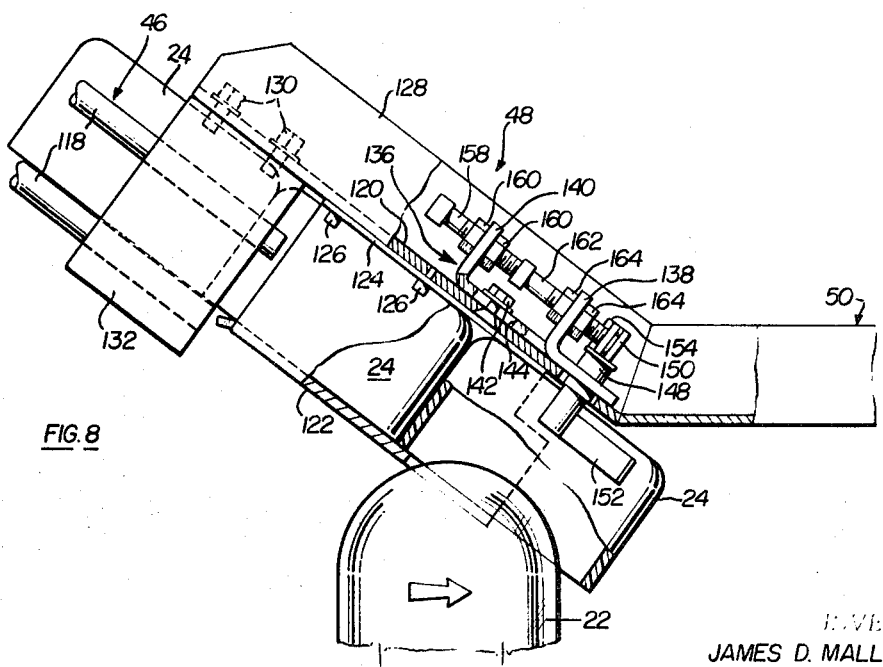
FIG. 8 is a detail side elevational view of the discharge gate with certain parts broken away or shown in section.

Details of assembly station 44 are shown in FIGS. 6, 7 and 8. Referring to FIGS. 6 and 8, inverted cup-shaped base elements 24 are gravitationally fed down chute 46 along a downwardly inclined path. Chute 46 is defined by a series of rods 118 suitably arranged to confine and guide the bases 24 in movement to discharge gate 48. The base element 24 at the head of the line of base elements in chute 46 is releasably retained by discharge gate 48 in the position shown in FIG. 8 so that, as a container 22 is advanced along conveyor 25, the container passes into underlying relationship with the base and then contacts the inner sidewall of the base, the moment of contact being shown in FIG. 8.

The base is releasably retained, by mechanism to be described below, and further rightward movement of the container 22 from the position shown in FIG. 8 causes the container to capture the base and remove it from the discharge gate, the base dropping down onto the container as it is pulled free from the discharge gate.

Discharge gate 48 includes an open-ended boxlike frame constructed from a top plate 120 and a lower member 122 which is of generally U-shaped transverse cross section and constitutes the sides and bottom of the boxlike frame. Along the upper edges of each side, the member 122 is formed with outwardly projecting flanges 124 by means of which the lower member 122 is secured to the bottom side of top plate 120 as by bolts 126. Top plate 120 is formed with upwardly projecting flanges 128 which serve to partially shield and protect portions of the gate mechanism. Top plate 120 projects rearwardly beyond lower member 122 and is bolted, as by bolts 130, to a frame member 132 at the terminal end of chute 46.

Top plate 120 and its attached lower member 122 define, in effect, an extension of chute 46. At the right-hand end of discharge gate 48, the bottom of lower member 122 is formed with a semicircular recess 134 which provides clearance for the container bottom as it is moving into operative relationship with a base element 24.

The operative parts of the gate mechanism are mounted upon a bracket member 136 shaped generally in the form of a T when viewed from the top, as in FIG. 7. At the end of each arm of the T-shaped bracket 136, integral upstanding lugs 138 are formed, while a third lug 140 is formed at the base of the leg of the T-shaped bracket. Bracket 136 is mounted upon top plate 120 by nut and bolt assemblies 142, the bracket being formed with elongate slots 144 so that its position longitudinally of top plate 120 may be adjusted as desired. Top plate 120 is formed with a centrally located extension 146 to receive the right-hand nut and bolt assembly 142.

At the end of each arm of the T-shaped bracket 136, a bushing 148 is fixedly mounted in and projects through the bracket and receives a shaft 150 for rotation within the bushing. Each shaft, at its lower end, carries a gate member 152, the gate members 152 being the elements which contact the base element to hold it in its ready position. Gate members 152 are fixedly secured to and rotate with the respective shafts 150.

At the upper end of each shaft 150, a crank arm is fixedly mounted upon the shaft 150 and projects radially from the shaft. A tension spring 156 is fastened to the distal end of each crank arm 154, each spring being attached, at its opposite end, to a tension-adjustment screw 158, the screws 158 passing freely through bores in the central lug 140 on bracket 136. A pair of nuts 160 are threadably received on each screw 158 at opposite sides of lug 140 to adjustably position their associated screws 158, and hence regulate the tension of the associated spring 156.

Adjustment screws 162 similarly pass freely through bores in the respective outer lugs 138 and are adjustably positioned by pairs of nuts 164 received on the screw on opposite sides of each lug 138. Adjustment screws 162 engage the respective crank arms 154 to thereby establish a rotative end limit of movement of the associated shaft 150 under the biasing action of spring 156 and hence the normal rest position of its attached gate element 152.

The normal rotative rest positions of the two shafts 150 are adjusted by setting the adjustment screws 162 so that the two gate elements 152 tangentially engage and position the endmost base element 24 at its maximum possible projection from the gate. When in this position, the rearward or left-hand portion of the base element sidewall will be very close to or right at the edge of the semicircular recess 134 in the bottom of the lower gate frame element 122. In this position, the base element is supported by lower element 122 from beneath at approximately the rearward or left-hand half of its sidewall and is held in a stable position by the pressure of the line of base elements behind it in cooperation with the gate elements 152.

Substantially the entire container receiving opening of the base element is thus exposed so that, as thus seen in FIG. 8, the container bottom can enter the base element as deeply as possible before engaging and capturing the base element. At the high production rate at which the apparatus is operated - rates of up to several hundred containers per minute - it is essential that the capture of the base element by the container be performed with a high degree of reliability. Failure to properly capture and remove the base element can result in a jamming of the line. The deeper the container is able to enter the base before engaging the base, the higher the degree of reliability of the capturing step.

In addition to positioning the base as close as possible to the "edge", it is also necessary to have the container pass the semicircular recess edge at 134 with a minimum amount of clearance. The height limiter 42, described above, is employed to provide a positive assurance of clearance by establishing the maximum permitted height of the container bottom above the conveyor path as the container approaches edge 134.

With the discharge gate adjusted as described above, the passage of a container 22 through the assembly station causes the container bottom to engage the endmost base element in the discharge gate. Movement of the container to the right beyond the position shown in FIG. 1 pulls the captured base element along with the container, the gate elements 152 pivoting outwardly against the action of springs 156 as the captured base element is moved to the right, as viewed in FIG. 8, with the container. When the container has pulled the captured base element beyond the edge of recess 134, the rearward or trailing side of the base element is no longer supported by the discharge gate and is free to drop downwardly toward and onto the container bottom. To some extent, this dropping action is essentially a downward pivoting action about the point of contact of the leading edge of the base element with the container, this pivoting action being supplemented by the resistance applied to the base element by the gate members 152. Further rightward movement of the container and its captured base element pulls the captured base element through the opening gate elements 152. As the captured base finally clears the gate elements, they are swung back into their closed position by the springs 156 in time to engage the next following base element which is automatically fed into position by the gravitational force of the stack of base elements behind it.

BASE SEATING AND ALIGNING

The base element captured by the container as described above is located on the container in only an approximate assembled position. Positioning of the captured base element in its final assembled relationship to the container is performed in two steps. In the first of these two steps the base is forced downwardly onto the container and is "seated"; in the second step the seated base is accurately squared up with the container axis so that the bottom of the base lies in a plane perpendicular to the axis.

It is to be noted that the shape of the bottom of container 22 is a smoothly rounded surface and the container does not present to the base any shoulder or abutment surface against which the base can be positively aligned. In order to assure an adequate permanent bond between the base element and the glass container, it is necessary that the base snugly engage the container around its entire periphery.

Because the base snugly engages the container around its entire periphery, this engagement provides a seal and traps a pocket of air inside of the base as soon as this seal is made. Because the base must be pushed farther onto the container into its final assembled position, this trapped air pocket would become compressed and thus tend to at least partially eject the base from the container. To prevent this air pressure from building up, the bottom of the base element is vented as by vent openings 170 (FIGS. 6 and 10).

The seating of the base upon the container is accomplished by a stationary seating plate designated generally 50 which extends downstream of the path of movement of containers on conveyor 25 from discharge gate 48. Seating plate 50 is a smooth surfaced plate which is mounted on the conveyor frame to be inclined downwardly in its extent away from discharge gate 48. The captured base elements engage and slide along the underside of seating plate 50 as they are conveyed away from the discharge gate, and the downward inclination of plate 50 forces the base elements downwardly onto the container to seat them at the desired axial position with respect to the container.

Because the seating plate 50 is inclined, the bases which are seated by plate 50 end up at the desired axial position, but tilted slightly with respect to the container axis. It is thus necessary to "untilt" the bases after they have been seated. This latter orientation is performed by the overhead conveyor designated generally 52 described briefly at the beginning of the specification.

Figure 9:
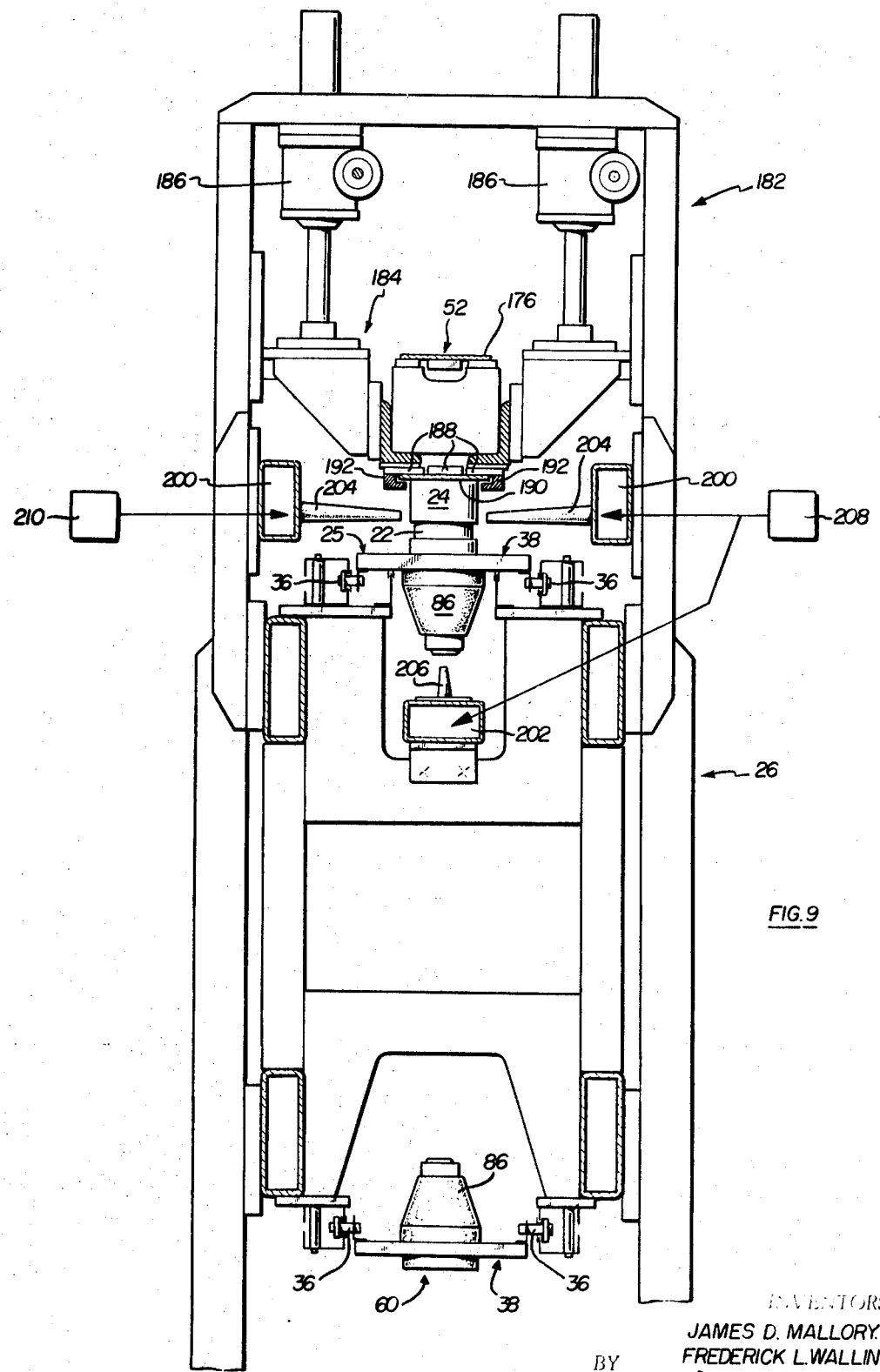
FIG. 9 is a detail cross-sectional view taken approximately on line 9—9 of FIG. 1.

Conveyor 52 is shown generally in side elevation in FIG. 1 and in cross section in FIG. 9. This conveyor is of the endless flat top chain-type and includes an endless chain 176 (FIG. 9) operatively trained about a pair of end rolls 178 (FIG. 1) and driven, as viewed in FIG. 1, by a drive train 180 in a counterclockwise direction about the end rolls, i.e., - the lower run moves from left to right in FIG. 1 at the same speed of movement and in the same direction as the adjacent upper run of the container conveyor 25.

The entire conveyor assembly 52 is a separate assembly mounted upon its own frame designated generally 182 which is in turn mounted upon the main conveyor frame 26. The chain 176, end rolls 178 and drive 180 are all mounted upon a subframe 184 suspended from frame 182 by four suitably located screw jacks 186 to enable the belt to be vertically adjusted to accurately space and align the operative lower run of the chain with respect to the path of travel of the upper run of container conveyor 25.

Referring now particularly to FIG. 9, subframe 184 of the overhead conveyor includes a series of backup plates 188 which overlie and extend substantially the entire length of the lower run 190 of chain 176. Chain guides 192 are provided to maintain the chain in or closely adjacent to sliding engagement with the underside of backup plates 188. Plates 188 are located in accurate parallelism with the path of travel of container support elements 70 and thus maintain the lower run 190 of the overhead conveyor chain in a plane perpendicular to the axes of containers being conveyed on the container conveyor. As shown in FIG. 9, lower run 190 engages the bottom of the captured base element 24 and thus forces it to the desired final orientation relative to the axis of the container. Because the lower run 190 of the overhead conveyor is driven in the same direction and at the same speed as the upper run 34 of container conveyor 25, there is no relative motion between the chain and the container base while the two are in contact and hence an accurate positioning of the base upon the container is achieved and maintained over the entire length of the overhead conveyor 52.

BONDING THE BASE TO THE CONTAINER

The present apparatus was designed for use in a continuous assembly line system through which the glass container moves continuously from its formation in the container-forming machine to final palletizing of the completed composite containers for shipment. At the time the container reaches the assembly machine of the present application, it is still residually heated from its formation to a temperature of over 300° F. Prior to its assembly upon the glass container, the base element is provided with an annular band of hot melt adhesive A (FIG. 1) whose characteristics are such that it is activated by the residual heat of the container when the base is placed on the container. This adhesive will set to form a permanent bond between the base and glass container if it is cooled to a temperature below its activating temperature.

In order to set the activated adhesive, the container is actively cooled while it is passing the overhead conveyor 52.

To actively cool the containers, cooling manifolds 200 are mounted upon the overhead conveyor frame 182 to extend along opposite sides of the path of travel of the containers, while a third cooling manifold 202 is mounted upon conveyor frame 26 underneath the path of travel of the containers. Manifolds 200 are both provided with a series of nozzles 204 which are located to discharge air onto the containers adjacent to the end of the base. A series of nozzles 206 is mounted on the lower manifold 202 to discharge upwardly into the mouths and interior of the containers as they pass beneath overhead conveyor 52.

Manifolds 200 and 202 are supplied with air chilled to approximately 60° F. from one or more suitable sources schematically indicated at 208, 210 in FIG. 9.

It will be noted that the adhesive is set by cooling the container while the base is positively maintained in accurate oriented registry with the container by overhead conveyor 52, thus assuring accurate alignment of the completed composite container.

VENT SEALER

While the provision of the vent openings 170 in base elements 24 is necessary, for reasons described above, during the assembly of the container, their presence in the completed composite container is undesirable. The problem presented by the vent openings arises in the bottling plant where the beverage being bottled will inevitably find its way into the interior of the base through vent openings 170. In the case of fermented beverages, such as beer, the conditions inside the assembled base element are conducive to the formation of molds, while with other beverages, unpleasant odors, inopportune leakage or stickiness can occur. Therefore, the present apparatus is preferably provided with a vent sealer schematically illustrated at 56 (FIG. 1). Vent sealer 56 may take any of several alternative forms as, for example, a hot plunger reciprocated in synchronism with the movement of containers along the container conveyor to heat-seal the vent opening by melting the plastic material of the base in the area through which the vent openings are formed.

Having described one exemplary form of our invention, We claim:

1. The method of assembling a composite container consisting of a bulb-shaped glass container symmetrical about a central vertical axis and having a spherically shaped bottom, and a generally cylindrical base element open at one end and adapted to snugly receive the container bottom therein and having means defining a flat bottom support surface at its opposite end to provide a stable support for the assembled container; comprising the steps of: conveying the bulb-shaped glass container in an inverted position along a first path to and from an assembly station, releasably supporting a base element at the assembly station above the first path in an inverted position inclined and oriented with respect to the path of movement of the container along said first path such that the container in moving past the assembly station engages and releases the base element to cause the base element to drop onto the inverted bottom of the container in an approximately assembled position, conveying the container with the approximately located base element supported thereon into engagement with an inclined surface spaced from and oriented relative to said first path to engage the flat support surface at the bottom of the base element and to press the base element onto the container with the flat surface of the base inclined with respect to the container axis, and then conveying the container and base beneath an aligning surface oriented to shift the base element on the container to locate the flat surface of the base element in perpendicular relationship to the container axis.

2. The method defined in claim 1 wherein the base element has applied thereto an annular band of hot melt adhesive located to contact the container when the base element is assembled thereon; further comprising the steps of advancing the container to the assembly station while the container is at a temperature below its deformation temperature and above the minimum temperature necessary to activate the adhesive, activating the adhesive by the engagement of the base element with the heated container, and actively cooling the assembled base element and container to set the adhesive while the base element is maintained in its final assembled position on said container by said aligning surface.

3. The method of assembling a composite container consisting of a bulb-shaped glass container having a spherically shaped bottom and a generally cylindrical base element open at one end to receive the container bottom to provide a stable support for the glass container comprising the steps of; forming the glass container, cooling the container to a temperature below its deformation temperature, conveying the formed container in an inverted position along a first path while the container still residually heated from the container forming step dropping onto the inverted container an inverted base element having an annular band of hot melt adhesive capable of being activated by the residual heat of the container extending around the interior of the base element adjacent the open container receiving end of the base element, seating and aligning the base element upon the container to activate the hot melt adhesive by the residual heat of the container, and subsequently actively cooling the aligned base element and container to set the adhesive.

4. The method as defined in claim 3 wherein the seating and aligning step is performed by conveying the container with the base element thereon beneath an aligning surface which engages the base element to seat and align the base element into its final assembled position on the container as said container is conveyed along said first path, and the cooling step is performed while the base element is engaged with the aligning surface.

5. The method of assembling a composite container consisting of a bulb-shaped glass container having a spherically shaped bottom and a cup-shaped generally cylindrical base element open at its upper end to receive the container bottom to provide a stable support for the glass container, the bottom of the base element having vent openings therein; comprising the steps of: conveying the container in an inverted position along a first path to an assembly station, dropping an inverted base element onto the bottom of the inverted container into an approximate assembled position, seating and aligning the base element into its final assembled position upon the container while venting the interior of the base element through the vent openings, bonding the aligned base element and container to each other in their final assembled position, and subsequently sealing the vent openings.

6. The method of assembling a composite container consisting of a bulb-shaped glass container having a spherically shaped bottom and a generally cylindrical base element open at one end to receive the container bottom to provide a stable support for the glass container comprising the steps of conveying the glass container in an inverted position along a first path to and past an assembly station, supporting inverted base elements at the assembly station in an inclined position at a fixed elevation above said first path such that each container engages and captures a base element as it passes through the assembly station, subsequently aligning and bonding the captured base element to the container, gauging the elevation of containers moving along said first path toward said assembly station to detect overlength containers which project beyond a permitted maximum elevation relative to said first path at which the container is vertically positioned to engage and capture a base element at said assembly station, and depressing each overlength container to the permitted maximum elevation before the overlength container reaches the assembly station.

7. Apparatus for assembling cylindrical cup-shaped base elements upon spherically bottomed containers comprising means for conveying spherically bottomed containers in an inverted position along a first path, chute means for supporting and feeding cup-shaped base elements in an inverted position into overlying relationship with containers on said conveying means, said chute means terminating at a discharge gate having resilient means for releasably retaining a base element in an inclined position overlying the path of movement of said containers along said first path such that upon movement of a container past said discharge gate the container engages and releases the base element from said discharge gate and carries the base element away from said discharge gate in an approximately assembled position upon the container bottom, and aligning means overlying said first path downstream of said first path from said discharge gate for engaging and aligning the base elements into their final assembled position upon the container.

8. Apparatus as defined in claim 7 wherein said aligning means comprises a stationary seating plate overlying said first path and extending downstream from said discharge gate, the undersurface of said seating plate being flat and inclined downwardly toward said first path in its extent away from said discharge gate to slidably engage the approximately assembled base element and depress the base element downwardly onto its container as the container and base element are conveyed therebeneath, and base orienting means beyond the downstream end of said seating plate overlying said first path for shifting the base element upon its container into its final assembled position thereon.

9. Apparatus as defined in claim 8 wherein said base-orienting means comprises a stationary backup plate overlying said first path at a fixed elevation, an endless belt conveyor having a lower run underlying and slidably engaged with the underside of said backup plate, and means for driving said belt conveyor to move said lower run in the same direction and at the same speed as said conveying means, said lower run engaging the base element and moving with the base element as it is conveyed along said first path beneath said base-orienting means.

10. In an apparatus as defined in claim 8 wherein the base element is bonded to the container by a hot melt adhesive activated when said base element engages the container; the further improvement comprising means for cooling the container and base element to set the adhesive while the base element is engaged with said base-orienting means.

11. Apparatus for assembling cylindrical cup-shaped base elements upon a spherically bottomed container comprising means for conveying spherically bottomed containers in an inverted position along a first path, chute means for supporting and feeding cup-shaped base elements in an inverted position into overlying relationship with containers on said conveying means, said chute means terminating at a discharge gate having means for releasably retaining a base element in an inclined position overlying the path of movement of said containers along said first path such that upon movement of a container past said discharge gate the container engages and releases the base element from said discharge gate and carries the base element away from said discharge gate upon the container bottom, and means on said conveying means for vertically adjusting the elevation of containers moving along said first path at a location upstream of said discharge gate to establish a maximum permitted elevation of the container bottom to assure clearance between the container bottom and said discharge gate.

12. In an assembly apparatus for assembling cup-shaped elements upon containers, the apparatus including conveying means for conveying the containers in line along a first path extending beneath an element supply chute terminating at a discharge gate from which the elements are successively stripped by the containers as they pass beneath the discharge gate; the improvement comprising a container support assembly on said conveying means having a generally flat support frame mounted for edgewise movement along said first path, pocket means defining an elongate annular container receiving pocket on said support frame for supporting a container in an inverted position with the container bottom projecting upwardly above said pocket means during transit of said first path, means mounting said pocket means on said support frame with the pocket axis perpendicular to said support frame and supporting said pocket means for axial movement relative to said support frame, means engaged between said pocket means and said support frame releasably maintaining said pocket means at a normal position of maximum elevation relative to said support frame during transit of said first path, and height-limiting means mounted above said first path upstream from said discharge gate engageable with the bottom of a container supported in said pocket means and projecting above a maximum permitted elevation to depress the container to the permitted maximum elevation by depressing said pocket means axially from its maximum elevation, said means engaged being operable to maintain the pocket means in its depressed position.

13. In an assembly apparatus as defined in claim 12, the further improvement wherein said support comprises a generally flat platelike member having an extending open ended annular sleeve centrally located therein with the sleeve axis normal to said platelike member, said sleeve having a relatively large diameter cylindrical top section, a relatively small diameter bottom section, and a frustoconical central section joining the top and bottom sections to each other, said pocket means having an outer configuration complementary in shape to the interior of said sleeve and being axially slidably received in said sleeve, and an annular shoulder in the interior of said pocket means engageable with the container finish to support the container in an inverted position within said pocket means.

14. In an assembly apparatus as defined in claim 12; the further improvement wherein said means engaged between said pocket means and support frame comprises means defining an elongate slot in said support frame extending in a direction normal to the pocket means axis, means defining an axially extending slot in said pocket means, a pin mounted in said elongate slot for sliding movement longitudinally thereof and projecting into said axially extending slot for sliding movement therein, resilient means biasing said pin toward one end of said elongate slot and against one side of said axially extending slot, and means defining a notch in said one side of said axially extending slot for receiving said pin when said pocket means is at said normal position relative to said support frame.

15. In an assembly apparatus as defined in claim 12; the further improvement wherein the conveying means extends along an endless path, and reset means located adjacent said endless path downstream from said discharge gate engageable with a pocket means which have been depressed by operation of said height limiting means to restore the pocket means to its normal position relative to the support frame.

16. In an assembly apparatus as defined in claim 13; the further improvement wherein said means engaged between said pocket means and said support element comprises means defining a pair of diametrically opposed circumferentially elongated slots in said bottom section of said sleeve, a pair of diametrically opposed axially extending slots in said pocket means, a pin extending through all of said slots and projecting outwardly from opposite sides of said sleeve, a tension spring connected to both of the projecting portions of said pin and passing around one half of the circumference of the sleeve to resiliently bias the pin toward one end of the slots in said sleeve and against one side of the slots in said pocket means, and means defining aligned notches in the one side of the slots of said pocket means for receiving the pin when the pocket means is located at its normal position relative to the support frame.

17. In an assembly apparatus for assembling a cup-shaped base element upon the bottom of a bulb-shaped container, the apparatus including conveying means for conveying containers in an inverted position along a first path extending beneath a base element supply chute terminating at a discharge gage from which the base elements are successively stripped by the containers as they pass beneath said discharge gate; the improvement wherein said discharge gate comprises a tubular chute defining a passage shaped to confine and guide base elements in line in an inverted position to a discharge outlet at one end of the tubular chute, said tubular chute having spaced top and bottom walls inclined downwardly toward the first path with said outlet at the lower end of the tubular chute, means defining a semicircular recess in the lower edge of the bottom wall of said tubular chute at said outlet for permitting the passage of the bottom of an inverted container conveyed on the conveying means, a bracket mounted on said top wall for adjustable positioning longitudinally of said top wall toward and away from said outlet, and resiliently releasable gate means mounted on said bracket and projecting in front of said outlet for releasably retaining the endmost base element in said outlet in a ready position wherein the base element partially projects from said outlet with that portion of the base within the chute supported upon said bottom wall closely adjacent the edge of said recess.

18. In an assembly apparatus as defined in claim 17; the further improvement wherein said gate means comprises a pair of shafts mounted in said bracket for rotation about spaced parallel axes perpendicular to said top wall, a gate member mounted upon and extending radially from each shaft at the lower end thereof, a crank member mounted upon and extending radially from each of said shafts at the upper end of the shaft, resilient means interconnected between each crank member and said bracket resiliently biasing the shafts in opposite directions of rotation urging the gate members toward each other, and adjustment means mounted on said bracket engageable with said crank members to establish rotative end limits of movement of said shafts under the bias of said resilient means at which said gate members project symmetrically across and in front of said outlet to engage the endmost base element to establish its ready position in said tubular chute.

* * * * *